United States Patent
Song

(10) Patent No.: US 10,274,033 B2
(45) Date of Patent: Apr. 30, 2019

(54) ELECTRONIC DISC BRAKE

(71) Applicant: MANDO CORPORATION, Gyeonggi-do (KR)

(72) Inventor: Joon-Kyu Song, Gyeonggi-do (KR)

(73) Assignee: MANDO CORPORATION, Gyeonggi-Do (KR)

( * ) Notice: Subject to any disclaimer, the term of this patent is extended or adjusted under 35 U.S.C. 154(b) by 23 days.

(21) Appl. No.: 15/415,793

(22) Filed: Jan. 25, 2017

(65) Prior Publication Data
US 2017/0219036 A1    Aug. 3, 2017

(30) Foreign Application Priority Data

Feb. 3, 2016 (KR) .................. 10-2016-0013220

(51) Int. Cl.
*F16D 65/18* (2006.01)
*F16D 55/226* (2006.01)
(Continued)

(52) U.S. Cl.
CPC .......... *F16D 65/18* (2013.01); *F16D 55/226* (2013.01); *F16D 65/0075* (2013.01);
(Continued)

(58) Field of Classification Search
CPC .... F16D 65/18; F16D 55/226; F16D 65/0075; F16D 2121/24; F16D 2125/40; F16D 2125/50; F16D 2125/52
See application file for complete search history.

(56) References Cited

U.S. PATENT DOCUMENTS

| 2004/0187637 A1* | 9/2004 | Gokan | F16F 15/26 74/596 |
|---|---|---|---|
| 2006/0100054 A1* | 5/2006 | Maruyama | B60K 17/3462 475/221 |

(Continued)

FOREIGN PATENT DOCUMENTS

| CN | 103373330 | 10/2013 |
|---|---|---|
| KR | 10-2011-0057763 | 6/2011 |

(Continued)

OTHER PUBLICATIONS

Office Action dated Jul. 4, 2018 for Chinese Patent Application No. 201710064500.5 and its English machine translation by Global Dossier.

*Primary Examiner* — Melanie Torres Williams
(74) *Attorney, Agent, or Firm* — Ladas & Parry, LLP

(57) ABSTRACT

Disclosed is an electronic disc brake. The electronic disc brake includes a disc configured to rotate with vehicle wheels, a caliper housing configured to operate pad plates installed at both sides of the disc, and an actuator having a piston provided inside the caliper housing to come into close contact with the disc, a spindle rotatably installed at the caliper housing to reciprocate the piston, an electric motor configured to rotate the spindle, and a decelerator configured to transmit a rotational force of the electric motor to the spindle, in which the decelerator includes a power connection unit directly connected to the electric motor, and first and second deceleration gear units sequentially connected to the spindle, and the first deceleration gear unit includes a worm gear.

18 Claims, 5 Drawing Sheets

(51) Int. Cl.
*F16D 65/00* (2006.01)
*F16D 121/24* (2012.01)
*F16D 125/40* (2012.01)
*F16D 125/50* (2012.01)
*F16D 125/52* (2012.01)

(52) U.S. Cl.
CPC ...... *F16D 2121/24* (2013.01); *F16D 2125/40* (2013.01); *F16D 2125/50* (2013.01); *F16D 2125/52* (2013.01)

(56) References Cited

U.S. PATENT DOCUMENTS

| | | | |
|---|---|---|---|
| 2007/0062769 | A1 | 3/2007 | Noh |
| 2010/0275713 | A1* | 11/2010 | Penttila .................... B62K 5/01 74/473.3 |
| 2015/0082925 | A1* | 3/2015 | Ramirez, Jr. ............. F04B 9/02 74/89.23 |
| 2015/0362031 | A1* | 12/2015 | Kong ...................... F16D 65/18 188/72.7 |
| 2016/0032994 | A1* | 2/2016 | Sakashita ............. F16D 55/225 188/72.3 |

FOREIGN PATENT DOCUMENTS

| | | |
|---|---|---|
| KR | 10-2011-0072877 | 6/2011 |
| KR | 10-2011-0080219 | 7/2011 |

\* cited by examiner

【FIG. 1】
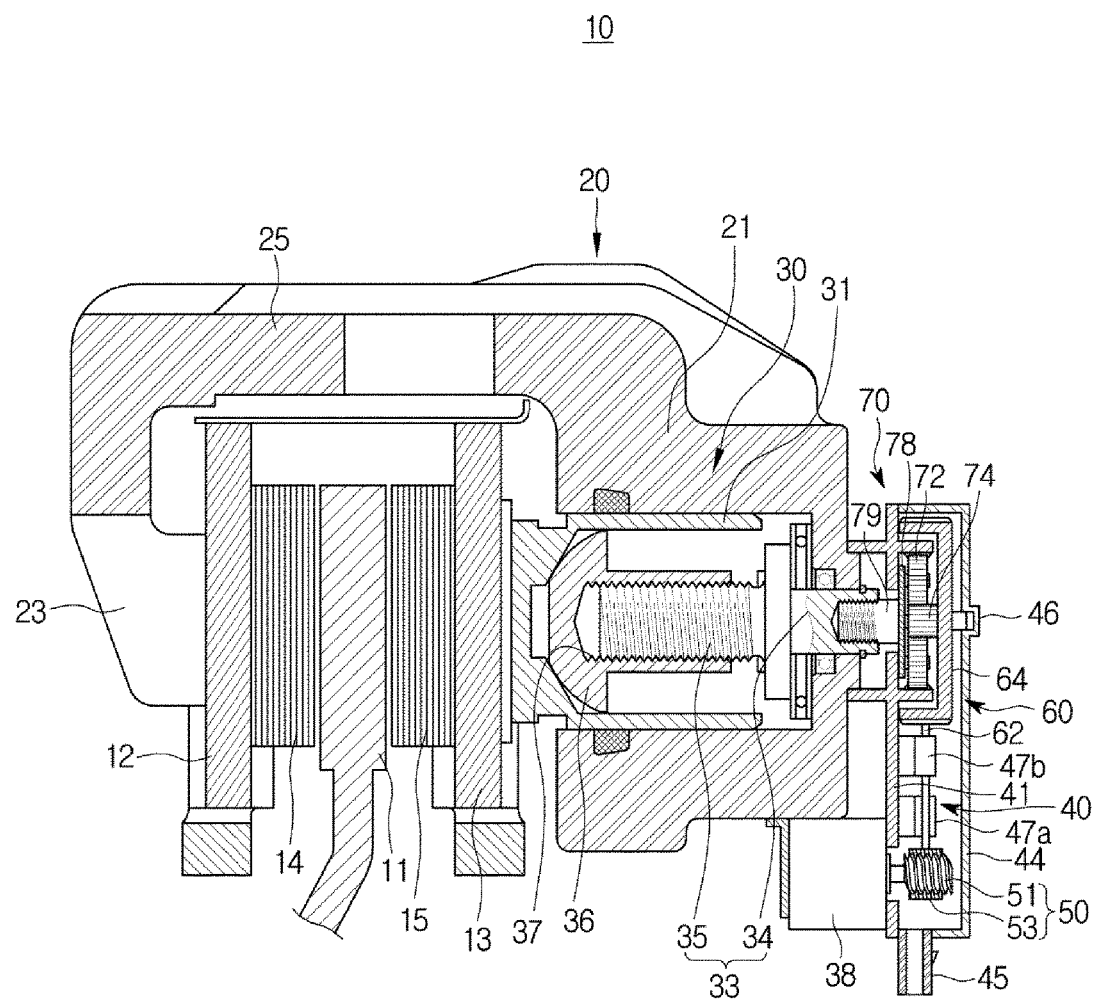

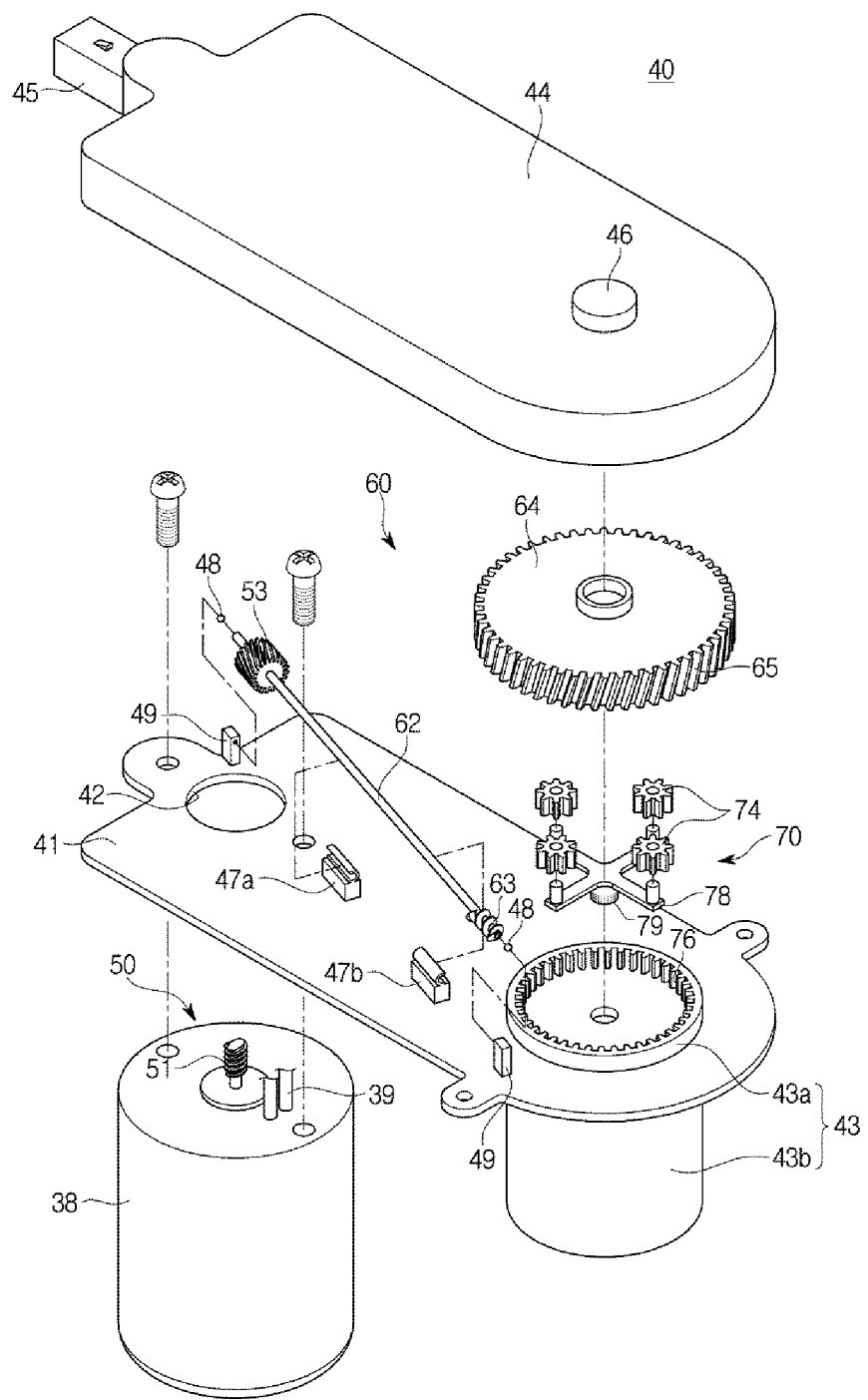
[FIG. 2]

[FIG. 3]
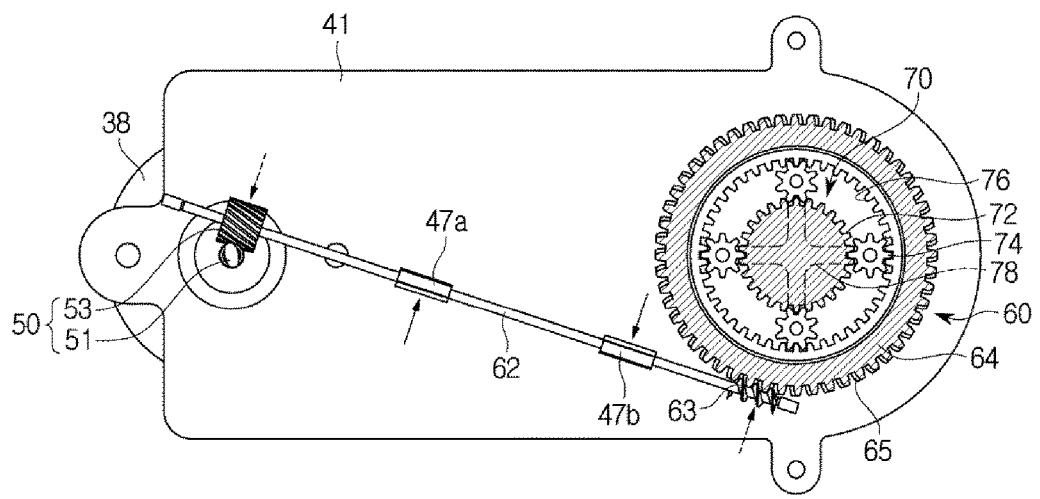

[FIG. 4]
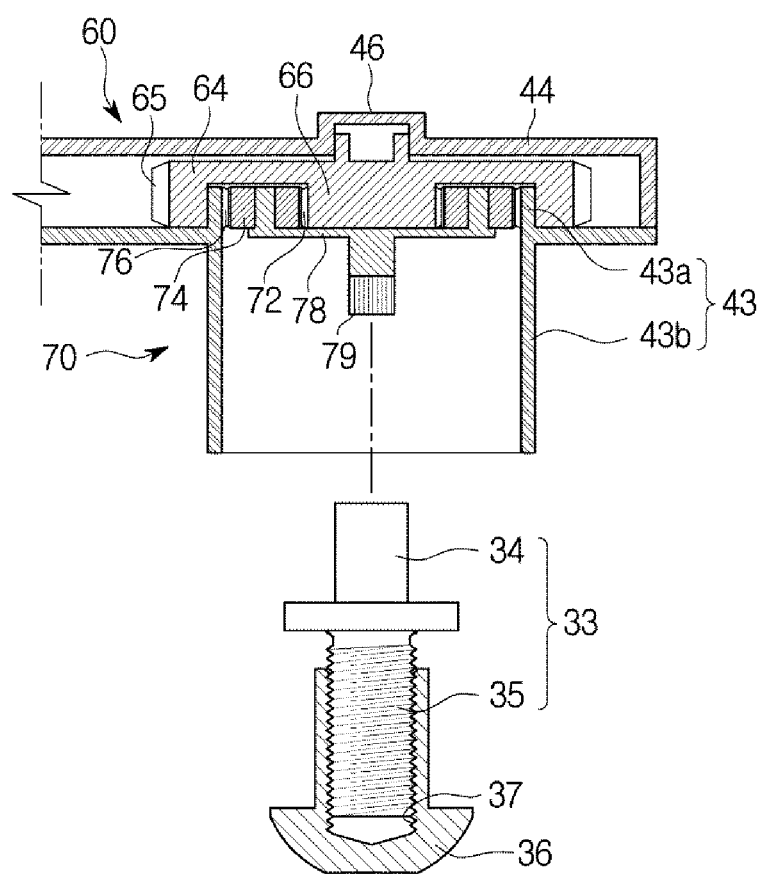

[FIG. 5]
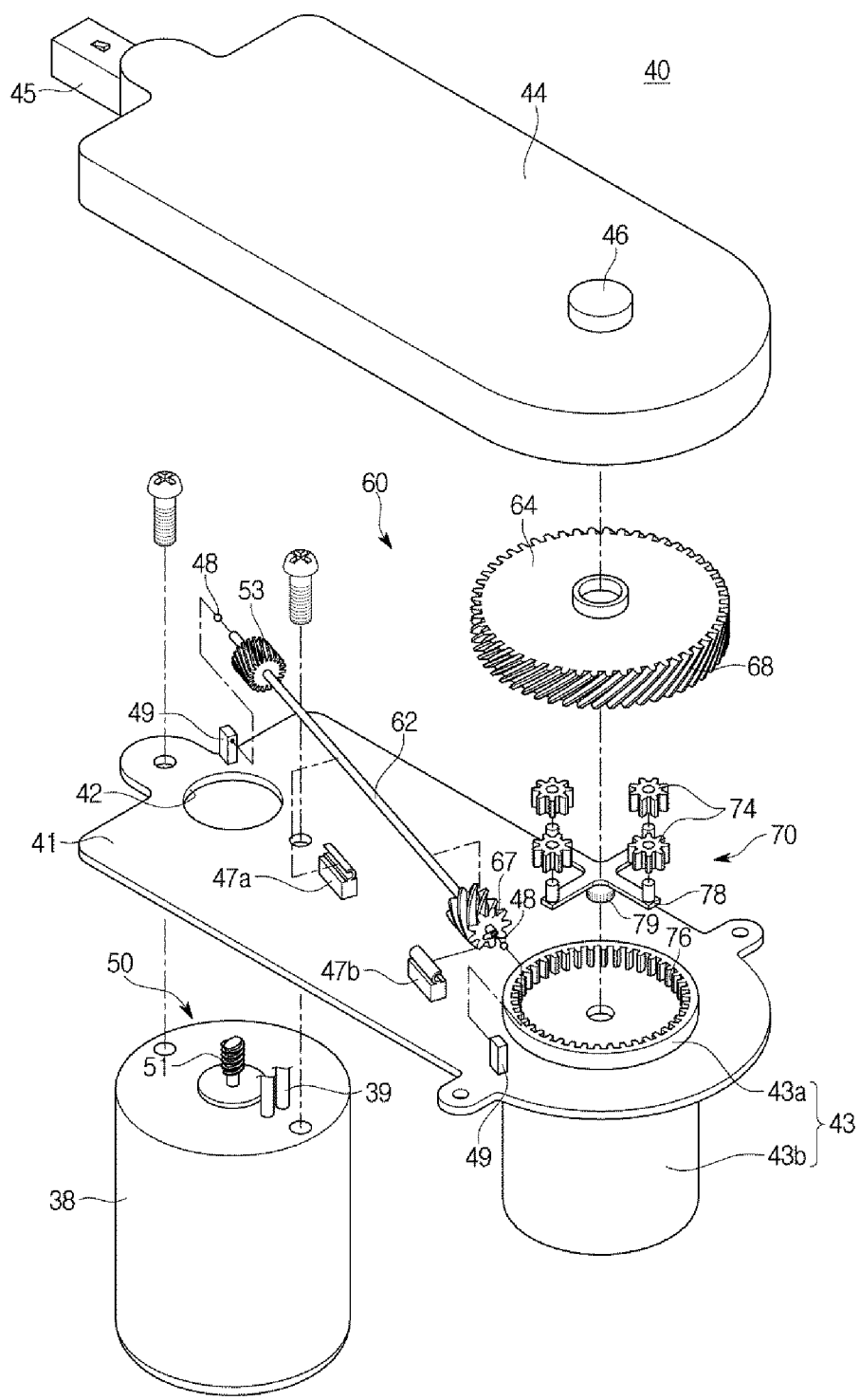

ELECTRONIC DISC BRAKE

CROSS-REFERENCE TO RELATED APPLICATION

This application claims the benefit of Korean Patent Application No. 2016-0013220, filed on Feb. 3, 2016 in the Korean Intellectual Property Office, the disclosure of which is incorporated herein by reference.

BACKGROUND

1. Field

The present disclosure relates to an electronic disc brake, and more particularly, to an electronic brake system capable of realizing a parking function by an operation of an electric motor.

2. Description of the Related Art

Generally, a brake device is a device for stopping a vehicle to prevent the vehicle from moving in braking or parking and serves to hold wheels of the vehicle to prevent the wheels from rotating.

An electronic parking brake (EPB) system that electronically controls an operation of a parking brake is widely used nowadays and is mounted on a typical disc brake to perform a function of the parking brake. Types of electronic disc brakes include a cable puller type, a motor-on-caliper (MOC) type, and a hydraulic parking brake type.

RELATED ART DOCUMENT

Korean Unexamined Patent Application Publication No. 10-2011-0072877 (Jun. 29, 2011)

The above document relates to an MOC type EPB actuator structure in which a motor generating power is connected to an actuator, and the power generated by the motor is transmitted to the actuator and a caliper by increasing torque while decelerating using a plurality of gear devices to perform a braking operation.

However, the plurality of gear devices installed for transmitting power has an adverse effect in terms of operating noise when braking. For example, an imprecise control of a coupling (an engagement) between gears may cause noise and vibration to be generated when the actuator operates and may degrade a durability of the actuator in more serious cases. Thus, a variety of research and development is underway to reduce operating noise of an electronic disc brake that uses a motor to automatically operate a brake. The above document suggests reducing noise by using a motor housing and disposing an anti-vibration rubber.in the motor housing.

SUMMARY

Therefore, it is an aspect of the present disclosure to provide an electronic disc brake in which a connection structure between elements, such as a connection structure between a power connection unit that transmits a driving force of a motor and a deceleration gear unit that decreases a rotational force, is improved.

Additional aspects of the disclosure will be set forth in part in the description which follows and, in part, will be obvious from the description, or may be learned by practice of the disclosure.

In accordance with one aspect of the present invention, an electronic disc brake includes a disc, a caliper housing, and an actuator. The disc is configured to rotate with vehicle wheels. The caliper housing is configured to operate pad plates installed at both sides of the disc. The actuator has a piston provided inside the caliper housing to press the pad plates to come into close contact with the disc, a spindle rotatably installed at the caliper housing to reciprocate the piston, an electric motor configured to rotate the spindle, and a decelerator configured to transmit a rotational force of the electric motor to the spindle. The decelerator includes a power connection unit directly connected to the electric motor, and first and second deceleration gear units sequentially connected to the spindle. The first deceleration gear unit includes a worm gear.

The power connection unit may include a drive helical gear provided at a rotating shaft of the electric motor and a driven helical gear provided at the first deceleration gear unit and engaged with the drive helical gear to convert a rotation direction.

The worm gear may include a worm shaft gear of a worm shaft directly connected to the power connection unit and a worm wheel gear of a worm wheel engaged with the worm shaft and directly connected to the second deceleration gear unit.

The decelerator may further include a housing plate and a housing cover, wherein the worm shaft may be supported by C-mounts which are provided on the housing plate and are open at respective corresponding sides thereof which are opposite to each other.

The housing plate includes bearing stoppers which are provided with ball bearings which are configured to rotatably support opposite ends of the worm shaft.

The decelerator may further include a housing plate and a housing cover, and the housing plate may include a motor installation part in which the electric motor is installed and a deceleration gear installation part in which the second deceleration gear unit is installed.

The second deceleration gear unit may include a sun gear, a plurality of planetary gears engaged to an outer portion of the sun gear, a ring gear which is an internal gear configured to accommodate the planetary gears, and a carrier installed to rotatably support the planetary gears and coaxially rotate with the sun gear and configured to output a rotational power. The deceleration gear installation part may include an upper deceleration gear installation part protruding from the housing plate, and the ring gear may be provided on an inner wall of the upper deceleration gear installation part.

The worm wheel may include a worm wheel gear provided at an outer side thereof, and a sun gear may be at an inner side of the worm wheel while being spaced apart from the worm wheel, the sun gear integrally formed with the worm wheel, wherein the ring gear and the planetary gears may be accommodated in an worm wheel inner space formed between the worm wheel gear and the sun gear.

In accordance with one aspect of the present invention, an electronic disc brake includes a disc, a caliper housing, and an actuator. The disc is configured to rotate with vehicle wheels. The caliper housing is configured to operate pad plates installed at both sides of the disc. The actuator has a piston provided inside the caliper housing to press the pad plates to come into close contact with the disc, a spindle rotatably installed at the caliper housing to reciprocate the piston, an electric motor configured to rotate the spindle, and a decelerator configured to transmit a rotational force of the electric motor to the spindle. The decelerator includes a power connection unit directly connected to the electric motor, and first and second deceleration gear units sequentially connected to the spindle; and the first deceleration gear unit includes a cross-helical gear.

BRIEF DESCRIPTION OF THE DRAWINGS

These and/or other aspects of the disclosure will become apparent and more readily appreciated from the following description of the embodiments, taken in conjunction with the accompanying drawings of which:

FIG. 1 is a cross-sectional view illustrating an electronic disc brake according to an embodiment of the present disclosure;

FIG. 2 is an exploded perspective view illustrating a decelerator of the electronic disc brake according to the embodiment;

FIG. 3 is an exploded cross-sectional view illustrating the decelerator of the electronic disc brake according to the embodiment;

FIG. 4 is a cross-sectional view illustrating a part of FIG. 2; and

FIG. 5 is an exploded cross-sectional view illustrating a decelerator of an electronic disc brake according to another embodiment of the present disclosure.

DETAILED DESCRIPTION

Hereinafter, embodiments of the present disclosure will be described in detail with reference to the accompanying drawings. Embodiments to be introduced below are provided as examples to sufficiently convey the spirit of the present disclosure to those of ordinary skill in the art to which the present disclosure pertains. The present disclosure is not limited to the embodiments to be described below and may also be embodied in other forms. To clearly describe the present disclosure, parts unrelated to the description have been omitted from the drawings, and widths, lengths, thicknesses, and the like of elements in the drawings may be exaggerated for convenience. Like reference numerals refer to like elements throughout.

FIG. 1 is a cross-sectional view illustrating an electronic disc brake according to an embodiment of the present disclosure, and the electronic disc brake illustrated in the drawing is a motor-on-caliper (MOC) type. FIG. 2 is an exploded perspective view illustrating a decelerator of the electronic disc brake according to the embodiment, FIG. 3 is an exploded cross-sectional view illustrating the decelerator of the electronic disc brake according to the embodiment, and FIG. 4 is a cross-sectional view illustrating a part of FIG. 2.

Referring to the drawings, an electronic disc brake 10 of the embodiment includes a disc 11 configured to rotate together with vehicle wheels, a carrier (not illustrated) on which a pair of pad plates 12 and 13 to which disc pads 14 and 15 are respectively attached are installed by being spaced apart from each other at a predetermined interval, a caliper housing 20 slidably installed at the carrier to operate the pad plates 12 and 13, and an actuator 30 having a piston 31 installed to be movable back and forth inside the caliper housing 20.

The caliper housing 20 is slidably installed at the carrier by a pair of guide rods (not illustrated), and the caliper housing 20 includes a cylinder unit 21 in which the piston 31 is inserted, a finger unit 23 configured to operate an outer pad plate 12 to be described below, and a connection unit 25 configured to connect the finger unit 23 to the cylinder unit 21.

The carrier is mounted on a knuckle of a vehicle body by a mounting bolt, and the caliper housing 20 is slidably coupled to both end portions of the carrier by the guide rods.

The disc pads 14 and 15 are attached to inner surfaces of the pair of pad plates 12 and 13, respectively. The pad plates 12 and 13 include an inner pad plate 13 disposed so that an outer surface thereof is in contact with a front end of the piston 31 and the outer pad plate 12 disposed so that an outer surface thereof is in contact with the finger unit 23.

The actuator 30 includes the piston 31 slidably inserted into the cylinder unit 21 of the caliper housing 20, a spindle 33 rotatably installed inside the cylinder unit 21 of the caliper housing 20, a nut spindle 36 installed inside the piston 31 to press the piston 31 or release the pressing of the piston 31 while moving back and forth by a rotation of the spindle 33, an electric motor 38 configured to rotate the spindle 33, and a decelerator 40 configured to transmit a rotational force of the electric motor 38 to the spindle 33.

The piston 31 is slidably inserted into the cylinder unit 21 as described above, and the piston 31 is provided in a cylindrical shape in which the inside thereof is recessed in a cup shape.

The spindle 33 has a support part 34 rotatably supported at a rear end side of the cylinder unit 21 and a male screw part 35 configured to extend a predetermined length into an inner central portion of the piston 31 from the support part 34.

The nut spindle 36 is formed in a cylindrical shape and includes a female screw portion 37, which is fastened to the male screw portion 35 of the spindle 33, formed at an inner surface thereof to move back and forth in an axial direction by the rotation of the spindle 33. Consequently, when the spindle 33 rotates in a forward direction or a reverse direction, the nut spindle 36 moves back and forth and presses the piston 31 such that braking occurs.

The electric motor 38 receives power by manipulation of a switch (not illustrated) provided at a driver seat of the vehicle and converts electrical energy into mechanical rotational kinetic energy. A braking operation according to an operation signal of the switch is controlled by an electronic control unit (ECU) of the vehicle which is not illustrated.

Referring to FIG. 2, the decelerator 40 includes a housing plate 41, a housing cover 44 coupled to the housing plate 41, and a power connection unit 50 and a plurality of deceleration gear units 60 and 70 that are provided in a space formed by the coupling of the housing plate 41 and the housing cover 44.

The housing plate 41 is provided in a plate shape, and includes a motor installation part 42, on which the electric motor 38 is mounted, formed at one side thereof and a deceleration gear installation part 43, on which the deceleration gear units are mounted, formed at the other side thereof. As shown in the drawing, the motor installation unit 42 is formed in a shape of a circular through hole, and the deceleration gear installation part 43 is formed in a shape of a cylinder vertically protruding from the housing plate 41. The electric motor 38 installed in the motor installation part 42 and the deceleration gear installation part 43 are provided parallel to each other, so that the electric motor 38 and the decelerator 40 are installed at the cylinder unit 21 of the caliper housing in a compact manner.

The housing cover 44 is formed in a shape of a box open at a lower side thereof, and is coupled to the housing plate 41 to form a space in between the housing cover 44 and the housing plate 41. The housing cover 44 and the housing plate 41 are formed of synthetic resin. The power connection unit 50 and the deceleration gear units 60 and 70 are fixedly installed on the housing plate 41, and the housing cover 44 is bonded to the housing plate 41 through a ultrasonic welding or a laser welding, thereby sealing the inside of the housing.

The housing cover 44 is provided at one side thereof with a connector 45 which electrically connects a power line 39 of the electric motor 38 to an external power source and at the other side thereof with a shaft protrusion 46 which is formed upwardly to support a worm gear provided at the second deceleration unit 70.

The power connection unit 50 directly connects the electric motor 38 to the first deceleration gear unit 60 to transmit a rotational force of the electric motor 38.

To this end, the power connection unit 50 includes a drive helical gear 51 provided on a rotating shaft of the electric motor 38 and a driven helical gear 53 engaged with the drive helical gear 51. The drive helical gear 51 is rotated on the rotating shaft of the electric motor 38, and the driven helical gear 53 engaged with the drive helical gear 51 converts a rotation of the drive helical gear 51 into to be perpendicular to rotation of the electric motor 38. Such a conversion of the rotation direction by the cross-helical gear provides a higher contact ratio compared when using a spur gear, so that noise is considerably reduced. Also, the helical gear with a gear ratio adjusted thereof may provide a deceleration function.

The first deceleration gear unit 60 is provided in the form of a worm gear, and the worm gear includes a worm gear 63 provided on a worm shaft 62 that is provided at one side thereof with the driven helical gear 53 and a worm wheel gear 65 provided on a worm wheel 64 that is engaged with one end of the worm shaft 62.

The worm shaft 62 is stably supported by a pair of C-mounts 47a and 47b provided on the housing plate 41. The C-mounts 47a and 47b each shaped in a circular ring having one side thereof open are provided in a pair and installed on the housing plate 41 while being spaced apart from each other by a predetermined distance. The open sides of the C-mounts 47a and 47b are disposed to be opposite to each other such that the worm shaft 62 passing through the C-mounts 47a and 47b are prevented from being separated from the C-mounts 47a and 47b in a thickness direction of the worm shaft.

In particular, referring to FIG. 3, when the driven helical gear 53 is engaged with the drive helical gear 51 in one direction (a dotted line), the worm shaft 64 is coupled to a first C-mounts 47a adjacent to the driven helical gear 53 in the opposite direction (a solid line), and is coupled to a second C-mounts 47b adjacent to the worm wheel 64 in the one direction, so that axis deviation between the gears and the worm shaft 62 in power transmission of the electric motor is efficiently prevented.

In addition, the worm shaft 62 has ball bearings 48 provided at opposite end portions thereof and is rotatably supported at a bearing stopper 49 of the housing plate 41 so that the worm shaft 62 is smoothly rotated.

The worm wheel 64 is rotated in engagement with the worm shaft gear 63 at one end of the worm shaft 62, to convert rotation of the worm shaft gear 63 to be perpendicular to the rotation of the worm shaft gear 63, that is, to be parallel to rotation of the electric motor. The worm wheel 64 is firmly supported by the shaft protrusion 46 provided on the housing cover 44.

Meanwhile, the second deceleration unit 70 includes a sun gear 72, a plurality of planetary gears 74 engaged with an outer side of the sun gear 72, a ring gear 76 which is an internal gear configured to accommodate the plurality of planetary gears 74, and a carrier 78 installed to rotatably support the planetary gears 74 and to coaxially rotate with the sun gear 72 and configured to output rotational power.

The sun gear is provided in the worm wheel 64. In detail, referring to FIG. 4, the worm wheel 64 is provided at an outer circumference thereof with the worm wheel gear 65 having a large diameter and engaged with the worm shaft 62, and at an inner circumference thereof with a protrusion 66 which protrudes in an axial direction of the worm wheel 64, and the sun gear 72 is provided around an outer circumference of the protrusion 66. Accordingly, a space is formed between the inner circumference of the worm wheel 64 and the outer circumference of the protrusion 66, and the sun gear 72, the planetary gears 74 engaged with the ring gear provided in the inner circumference of the second deceleration gear installation part 43, and the ring gear 76 are accommodated in the space. According to the embodiment of the present disclosure, the gears 72, 74, and 76 of the second deceleration gear unit 70 are provided in the wheel gear 64 at the same height, thereby providing the decelerator with a compact structure. Also, the worm wheel 64 is stably supported by the shaft protrusion 46 of the housing cover 44 and the deceleration gear installation part 43, thereby preventing axis deviation of gears after a long period of use.

The planetary gears 74 are provided in four units thereof, and are rotatably provided on four slit parts of the carrier 78, respectively.

The ring gear 76 is provided in the form of an internal gear in the deceleration gear installation part 43. The deceleration gear installation part 43 includes an upper deceleration gear installation part 43a protruding upward from the housing plate 41 and a lower deceleration gear installation part 43b protruding downward from the housing plate 41.

The ring gear 76 is provided in an inner wall of the upper deceleration gear installation part 43a protruding from the housing plate 41 and the upper deceleration gear installation part 43a includes a carrier hole formed at a center thereof. The carrier hole allows a carrier output shaft 79 of the second deceleration gear unit 70 to be exposed downward of the housing plate 41 toward the lower deceleration gear installation part 43b. The carrier output shaft 79 is coupled to the spindle 33.

Here, the decelerator 40 will be briefly described again. The drive helical gear 51 of the power connection unit 50 meshing with the electric motor 38 has a rotation direction thereof converted through the driven helical gear 53, and the driven helical gear 53 has a rotation direction thereof converted through the worm shaft 62 of the first deceleration gear unit 60 so as to transmit the converted rotational force to the worm while 64. The worm wheel 64 is connected to the sun gear 72 of the second deceleration gear unit 70 which is integrally formed with the worm wheel 64, and the sun gear 72 transmits a rotational force through the output shaft 79 provided at the center of the carrier 78 through the planetary gears 74 engaged with the ring gear 76. The output shaft 79 of the carrier 78 is finally connected to the spindle 33 of the actuator to decelerate the rotational force of the electric motor 38 and provide the spindle 33 with the decelerated rotational force.

Accordingly, the decelerator 40 according to the embodiment of the present disclosure enables the spindle 33 to be decelerated and also to be rotated at a high torque while miniaturizing the electric motor 38. For example, when the operation of the electric motor 38 is stopped while braking is performed, the rotation of the spindle 33 is limited by the large reduction ratio of the decelerator 40 so that a braking state is maintained.

In particular, since the power connection unit 50 is provided in the form of a helical gear and the first deceleration gear unit 60 is provided in the form of a worm gear, low noise is produced, so that a motor housing and an additional sound absorption material are not needed to reduce noise. Also, since the worm gear has a large reduction ratio, the deceleration gear unit does not need to be manufactured in multi-stages, so that the deceleration gear unit is provided with a compact size. In addition, as for the first deceleration gear unit 60 in the form of a worm gear, the worm shaft 62 drives the worm wheel 64, but the worm wheel 64 does not drive the worm shaft 62, thereby preventing the braking from being released at a time of power-off of the electric motor 38. In addition, as shown in the drawings, the electric motor 38 is disposed at a lateral side of the decelerator 40 such that the center axis of the electric motor 38 is in line with the center axis of the decelerator 40, thereby having a reduced overall length.

A braking operation of the electronic disc brake having the above structure is performed as below.

When a driver manipulates a parking switch provided at a driver seat of a vehicle for braking (including parking), the electric motor 38 rotates. The rotation of the electric motor 38 is decelerated through the decelerator 40 and rotates the spindle 33 with a great force.

When the spindle 33 rotates, the nut spindle 36 moves in the axial direction and presses the piston 31 so that braking is performed.

An operation of the electric motor 38 is stopped while the braking is performed, and the rotation of the spindle 33 is limited by the worm gear of the first deceleration gear unit 60 having a large reduction ratio. Accordingly, the braking state is maintained unless the electric motor 38 is driven again.

When a driver releases the braking, the driver releases the braking by manipulating the parking switch of the driver seat. In this case, since the electric motor 38 operates in a reverse direction of the braking and the spindle 33 rotates in a reverse direction of braking, the nut spindle 36 releases the pressing of the piston 31 and thus the braking is released.

FIG. 5 is an exploded cross-sectional view illustrating a decelerator of an electronic disc brake according to another embodiment of the present disclosure. In the following description, details of parts identical to those of the previous embodiment will be omitted in order to avoid redundancy. Like reference numerals refer to like elements throughout.

A decelerator according to another embodiment of the present disclosure uses a cross-helical gear as the first deceleration gear unit 60. The cross-helical gear includes a first helical gear 67 and a second helical gear 68 which are provided at one end of the worm shaft 62 and at an outer circumference of the worm wheel 64, respectively, ad are engaged with each other. Since the cross-helical gear produces reduced noise, a motor housing and an additional sound absorption material are not needed to reduce noise. Also, since the cross-helical gear has a large reduction ratio, the deceleration gear unit does not need to be manufactured in multi-stages, thus has a compact size thereof. Also, the cross-helical gear allows a predetermined clearance in engagement, so that assembly property is improved.

As is apparent from the above description, the electronic disc brake according to the embodiment of the present disclosure uses a helical gear as a power connection unit of a decelerator and uses a worm gear or a cross-helical gear as a deceleration gear unit of the decelerator, thereby providing a compact structure and a reduced noise.

The electronic disc brake according to the embodiment of the present disclosure can prevent an actuator spindle from reversely rotated at a time of power-off of the electric motor by using a worm gear having a large reduction gear ratio as a first deceleration gear unit, and can provide a compact structure thereof by providing a worm wheel of the worm gear at the same height as that of a second deceleration gear unit.

Also, the electronic disc brake according to the embodiment of the present disclosure can prevent off-axis between engaged gears and a worm shaft of a first deceleration gear unit that may occur during power transmission, by allowing the worm shaft to be preloaded by using C-mounts which are open at respective corresponding sides thereof opposite to each other.

The disclosed embodiments have been described above with reference to the accompanying drawings. Those of ordinary skill in the art to which the present disclosure pertains should understand that the present disclosure may be practiced in forms different from the disclosed embodiments without changing the technical spirit or essential features of the present disclosure. The disclosed embodiments are merely illustrative and are not to be construed as limiting.

What is claimed is:

1. An electronic disc brake comprising:
a disc configured to rotate with vehicle wheels;
a caliper housing configured to operate pad plates installed at both sides of the disc; and
an actuator having a piston provided inside the caliper housing to press the pad plates to come into close contact with the disc, a spindle rotatably installed at the caliper housing to reciprocate the piston, an electric motor configured to rotate the spindle, and a decelerator configured to transmit a rotational force of the electric motor to the spindle,
wherein:
the decelerator includes a power connection unit directly connected to the electric motor, and first and second deceleration gear units sequentially connected to the spindle;
the first deceleration gear unit includes a worm gear; and
the second deceleration gear unit includes an worm wheel comprising a worm wheel gear connected to the worm gear of the first deceleration at an outer portion of the worm wheel and a sun gear at an inner portion of the worm wheel, a plurality of planetary gears engaged to an outer portion of the sun gear, a ring gear which is an internal gear configured to accommodate the planetary gears, and a carrier installed to rotatably support the planetary gears and coaxially rotate with the sun gear and configured to output a rotational power.

2. The electronic disc brake of claim 1, wherein:
the power connection unit includes a drive helical gear provided at a rotating shaft of the electric motor and a driven helical gear provided at the first deceleration gear unit and engaged with the drive helical gear to convert a rotation direction.

3. The electronic disc brake of claim 1, wherein:
the worm gear includes a worm shaft gear of a worm shaft directly connected to the power connection unit and a worm wheel gear of a worm wheel engaged with the worm shaft and directly connected to the second deceleration gear unit.

4. The electronic disc brake of claim 3, wherein the decelerator further includes a housing plate and a housing cover, wherein the worm shaft is supported by C-mounts which are provided on the housing plate and are open at respective corresponding sides thereof which are opposite to each other.

5. The electric disc brake of claim 4, wherein the housing plate includes bearing stoppers which are provided with ball bearings which are configured to rotatably support opposite ends of the worm shaft.

6. The electric disc brake of claim 3, wherein the decelerator further includes a housing plate and a housing cover, and
the housing plate includes a motor installation part in which the electric motor is installed and a deceleration gear installation part in which the second deceleration gear unit is installed.

7. The electric disc brake of claim 6, wherein the deceleration gear installation part includes an upper deceleration gear installation part protruding from the housing plate, and
the ring gear is provided on an inner wall of the upper deceleration gear installation part.

8. The electric disc brake of claim 7, wherein the sun gear is spaced apart from the worm wheel, the sun gear integrally formed with the worm wheel,
wherein the ring gear and the planetary gears are accommodated in an worm wheel inner space formed between the worm wheel gear and the sun gear.

9. An electronic disc brake comprising:
a disc configured to rotate with vehicle wheels;
a caliper housing configured to operate pad plates installed at both sides of the disc; and
an actuator having a piston provided inside the caliper housing to press the pad plates to come into close contact with the disc, a spindle rotatably installed at the caliper housing to reciprocate the piston, an electric motor configured to rotate the spindle, and a decelerator configured to transmit a rotational force of the electric motor to the spindle,
wherein:
the decelerator includes a power connection unit directly connected to the electric motor, and first and second deceleration gear units sequentially connected to the spindle;
the first deceleration gear unit includes a cross-helical gear; and
the second deceleration gear unit includes an worm wheel comprising a worm wheel gear connected to the cross-helical gear of the first deceleration at an outer portion of the worm wheel and a sun gear at an inner portion of the worm wheel, a plurality of planetary gears engaged to an outer portion of the sun gear, a ring gear which is an internal gear configured to accommodate the planetary gears, and a carrier installed to rotatably support the planetary gears and coaxially rotate with the sun gear and configured to output a rotational power.

10. An electronic disc brake comprising:
a disc configured to rotate with vehicle wheels;
a caliper housing configured to operate pad plates installed at both sides of the disc; and
an actuator having a piston provided inside the caliper housing to press the pad plates to come into close contact with the disc, a spindle rotatably installed at the caliper housing to reciprocate the piston, an electric motor configured to rotate the spindle, and a decelerator configured to transmit a rotational force of the electric motor to the spindle, the decelerator comprising a housing plate and a housing cover,
wherein:
the decelerator includes a power connection unit directly connected to the electric motor, and first and second deceleration gear units sequentially connected to the spindle;
the first deceleration gear unit includes a warm shaft; and
the worm shaft is supported by C-mounts which are provided on the housing plate and are open at respective corresponding sides thereof which are opposite to each other.

11. The electronic disc brake of claim 10, wherein:
the power connection unit includes a drive helical gear provided at a rotating shaft of the electric motor and a driven helical gear provided at the first deceleration gear unit and engaged with the drive helical gear to convert a rotation direction.

12. The electronic disc brake of claim 10, wherein:
the worm gear includes a worm shaft gear of the worm shaft directly connected to the power connection unit and a worm wheel gear of a worm wheel engaged with the worm shaft and directly connected to the second deceleration gear unit.

13. The electric disc brake of claim 10, wherein the housing plate includes bearing stoppers which are provided with ball bearings which are configured to rotatably support opposite ends of the worm shaft.

14. The electric disc brake of claim 12, wherein the housing plate includes a motor installation part in which the electric motor is installed and a deceleration gear installation part in which the second deceleration gear unit is installed.

15. The electric disc brake of claim 14, wherein the second deceleration gear unit includes a sun gear, a plurality of planetary gears engaged to an outer portion of the sun gear, a ring gear which is an internal gear configured to accommodate the planetary gears, and a carrier installed to rotatably support the planetary gears and coaxially rotate with the sun gear and configured to output a rotational power,
wherein the deceleration gear installation part includes an upper deceleration gear installation part protruding from the housing plate, and
the ring gear is provided on an inner wall of the upper deceleration gear installation part.

16. The electric disc brake of claim 15, wherein the worm wheel includes a worm wheel gear provided at an outer side thereof, and a sun gear is provided at an inner side of the worm wheel while being spaced apart from the worm wheel, the sun gear integrally formed with the worm wheel,
wherein the ring gear and the planetary gears are accommodated in an worm wheel inner space formed between the worm wheel gear and the sun gear.

17. The electronic disc brake of claim 10, wherein the first deceleration gear unit includes a worm gear.

18. The electronic disc brake of claim 10, wherein the first deceleration gear unit includes a cross-helical gear.

* * * * *